United States Patent [19]

Nakamura

[11] Patent Number: 5,099,803
[45] Date of Patent: Mar. 31, 1992

[54] VISCOUS FLUID COUPLING APPARATUS

[75] Inventor: Ryuji Nakamura, Toyota, Japan

[73] Assignee: Aisin Seiki Kabushiki Kaisha, Kariya, Japan

[21] Appl. No.: 593,870

[22] Filed: Oct. 5, 1990

[30] Foreign Application Priority Data

Oct. 11, 1989 [JP] Japan .................. 1-264800

[51] Int. Cl.$^5$ .............................................. F01P 7/02
[52] U.S. Cl. .................... 123/41.12; 192/58 B; 192/82 T
[58] Field of Search .......... 123/41.12; 192/58 B, 192/82 T

[56] References Cited

U.S. PATENT DOCUMENTS

| | | | |
|---|---|---|---|
| 4,271,946 | 6/1981 | Bridge | 192/58 B |
| 4,405,039 | 9/1983 | Hauser | 192/58 B |
| 4,564,043 | 1/1986 | Storz | 192/58 B |
| 4,924,985 | 5/1990 | Kennedy | 192/58 B |
| 4,967,889 | 11/1990 | Ihlemann | 123/41.12 |

FOREIGN PATENT DOCUMENTS 63-180727  7/1988  Japan .

Primary Examiner—Noah P. Kamen
Attorney, Agent, or Firm—Oblon, Spivak, McClelland, Maier & Neustadt

[57] ABSTRACT

A viscous fluid coupling apparatus includes a shaft, a rotor, and a housing. The housing has a separator plate and a partition wall. The separator plate divides an inside of the housing into a reservoir chamber and an actuator chamber having a torque transmitter portion, and it has a communication hole communicating the reservoir chamber with the actuator chamber and a pump protrusion for transferring the viscous fluid in the reservoir chamber to the actuator chamber via the communication hole. The partition wall divides the reservoir chamber into an inner peripheral reservoir chamber communicated to the actuator chamber and an outer peripheral reservoir chamber communicated to the actuator chamber. Viscous fluid is pumped from the actuator chamber to the inner peripheral chamber by the pump hole, the pump protrusion and the communication hole, and less of the viscous fluid remains less in the actuator chamber when an engine is stopped. Therefore, less induced rotation occurs.

14 Claims, 1 Drawing Sheet

VISCOUS FLUID COUPLING APPARATUS

BACKGROUND OF THE INVENTION

1. Field of the Invention

The present invention relates to a viscous fluid coupling apparatus. The viscous fluid coupling apparatus may be employed as an automobile fan coupling or the like.

2. Description of the Related Art

A conventional automobile fan coupling has suffered from induced rotation of a fan disposed around a housing thereof, because all of the viscous fluid which is sealed in the fan coupling cannot be accommodated in a reservoir chamber of the fan coupling when an engine is stopped, and the viscous fluid remaining in an actuator chamber of the fan coupling consequently transmits torque to the housing of the fan coupling when the engine is started again, thereby causing the induced rotation of the fan.

Accordingly, a viscous fluid coupling apparatus as disclosed in Japanese Unexamined Patent Publication (KOKAI) No. 180727/1988 has been proposed. In this viscous fluid coupling apparatus, in addition to a conventional reservoir chamber, a second reservoir chamber is disposed on a side of an actuator chamber opposite to a side thereof having the conventional reservoir chamber, and the radius of the second reservoir chamber is made identical with the radius of the actuator chamber. With this arrangement, the amount of viscous fluid remaining in the actuator chamber, and immersing a torque transmitter portion of the viscous fluid coupling apparatus, is reduced when an engine is stopped, thereby substantially preventing the induced rotation of a fan from happening at the time of starting the engine.

However, this conventional viscous fluid coupling apparatus has a large axial length because the reservoir chambers are disposed on both sides of the actuator chamber. Consequently, there has arisen a problem that the viscous fluid coupling apparatus having the large axial length cannot be assembled in a space between a front surface of an automobile engine and a rear surface of a radiator where a very small space is usually provided. If the viscous fluid coupling apparatus can be assembled in the small space, the operability of the assembly has been very poor.

SUMMARY OF THE INVENTION

It is therefore an object of the present invention to provide a viscous fluid coupling apparatus which is capable of avoiding the induced rotation of a fan at the time of starting an engine and which does not cause the enlargement of an axial length thereof.

The above and other objects are achieved according to the present invention by a viscous fluid coupling apparatus comprising a rotatable driven shaft, a rotor connected coaxially to the driven shaft and rotating integrally with the driven shaft, a housing relatively rotatably held by the driven shaft and a separator plate in the housing. The separator plate divides the inside of the housing into a reservoir chamber for storing a viscous fluid and an actuator chamber for accommodating the rotor. The separator plate is disposed perpendicularly with respect to the axis of the shaft and has a communication hole penetrating therethrough for communicating the reservoir chamber with the actuator, and a pump protrusion for transferring viscous fluid in the reservoir chamber to the actuator chamber by way of a communication hole in accordance with rotation of the rotor. Means are provided on the rotor and at least one of the separator plate and the housing for forming a torque transmitter portion for transmitting torque between the rotor and the at least one separator plate and the housing in accordance with a variation in an amount of viscous fluid in the actuator chamber. A partition wall in the reservoir chamber divides the reservoir chamber into an inner peripheral reservoir chamber disposed on a central portion of the reservoir chamber and an outer peripheral reservoir chamber concentrically surrounding an outer periphery of the inner peripheral reservoir chamber. Means are provided for communicating the inner peripheral chamber with the actuator chamber and for communicating the outer peripheral chamber with the actuator chamber. The partition wall is disposed substantially parallel and coaxially with respect to the axis of rotation of the shaft, while the viscous fluid can be stored in the inner peripheral chamber and the outer peripheral chamber independently.

According to another feature of the invention, a viscous fluid coupling apparatus comprises a rotatably driven shaft, a rotor engaged with the shaft, a detachable housing relatively rotatably holding the shaft and a separator plate in the housing. The separator plate divides an inside of the housing into an actuator chamber for accommodating the rotor and a reservoir chamber. The separator plate has a fluid supply hole disposed in an inner peripheral portion thereof, the pump hole disposed at an outer peripheral portion thereof and a pump protrusion disposed adjacent to the pump hole. A partition wall concentrically divides the reservoir chamber into an inner peripheral reservoir chamber and an outer peripheral reservoir chamber. A communication conduit communicates the pump hole with the inner peripheral reservoir chamber, the communication conduit being disposed on a surface of the separator plate opposite to a surface of the separator plate on which the pump protrusion is disposed. A communication hole is provided through the separator plate for communicating the actuator chamber with the outer peripheral reservoir chamber, the communication hole being disposed opposite to the communication conduit with respect to the pump protrusion.

In the viscous fluid coupling apparatus according to the present invention, the two reservoir chambers are disposed on only one side of the actuator chamber. As a result, it is possible to prevent the induced rotation of a fan disposed around the housing of the viscous fluid coupling apparatus from happening at the time of starting an engine. Here, the advantage can be achieved without enlarging the axial length thereof.

Further, in the viscous fluid coupling apparatus according to the present invention, the heat of the viscous fluid contained in the actuator chamber can be radiated efficiently during the operation of the viscous fluid coupling apparatus, because the two reservoir chambers are disposed on one side of the actuator chamber, not on both sides of the actuator chamber as in the conventional viscous fluid coupling apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF A PREFERRED EMBODIMENT

Figure 1:
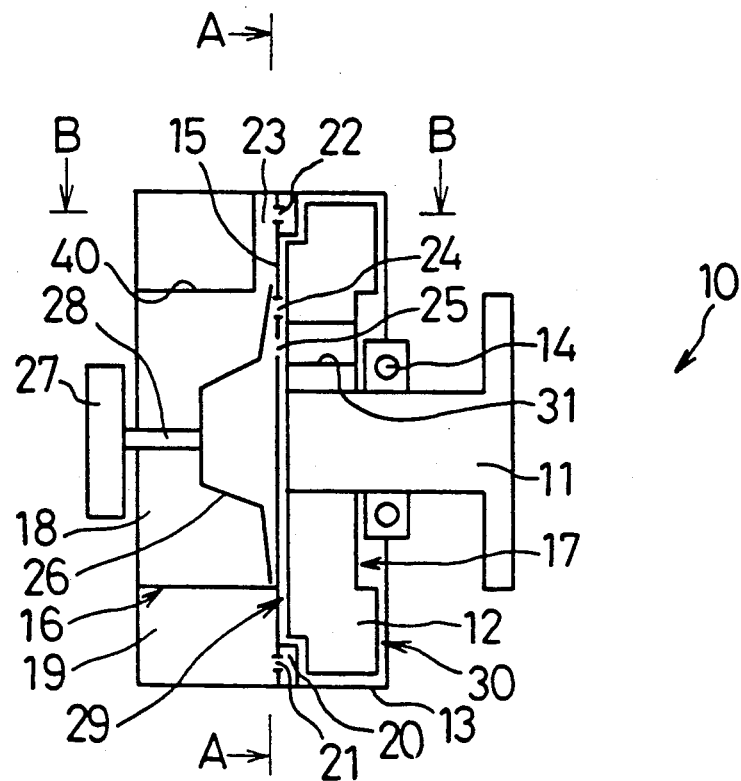
FIG. 1 is a schematic illustration of a viscous fluid coupling apparatus of a preferred embodiment according to the present invention.
Figure 2:
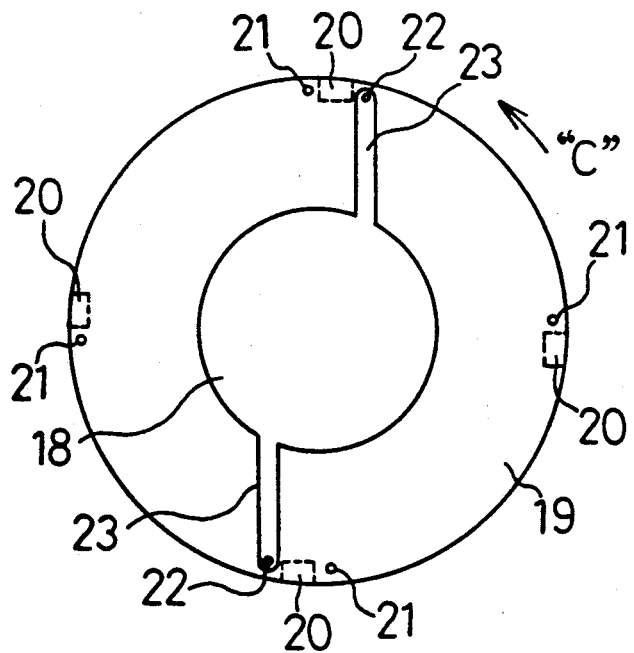
FIG. 2 is a schematic illustration of the viscous fluid coupling apparatus, and is taken in the direction of the arrows A—A of FIG. 1.
Figure 3:
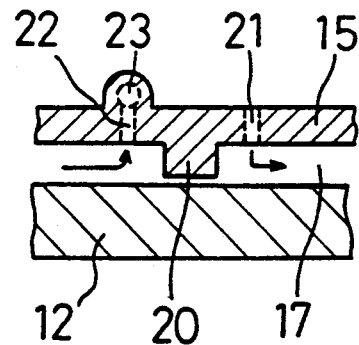
FIG. 3 is a schematic illustration of the viscous fluid coupling apparatus, and is taken in the direction of the arrows B—B of FIG. 1.

Having generally described the present invention, a further understanding can be obtained by reference to a certain specific preferred embodiment which is provided herein for purposes of illustration only and are not intended to be limiting unless otherwise specified. A viscous fluid coupling apparatus of a preferred embodiment in which the present invention is embodied will be hereinafter described with reference to the accompanying drawings. The viscous fluid coupling apparatus 10 is illustrated in FIGS. 1, 2 and 3 schematically. As mentioned above, FIG. 2 is a view of the viscous fluid coupling apparatus 10 taken in the direction of the arrows A—A of FIG. 1, and FIG. 3 is a view of the viscous fluid coupling apparatus 10 taken in the direction of the arrows B—B of FIG. 1.

The viscous fluid coupling apparatus 10 includes a driven shaft 11, a rotor 12 and a housing 13. The housing 13 has a separator plate 15 and a partition wall 40. The shaft 11 is rotatably connected to a crank shaft of an engine (not shown) by way of a belt (not shown), and receives a rotary force transmitted from the crank shaft of the engine. The rotor 12 is non-rotatably engaged with the shaft 11 at a left end of the shaft 11 in FIG. 1.

The housing 13 detachably and relatively rotatably holds the shaft 11 by way of a bearing 14. The interior of the housing 13 is divided into a reservoir chamber 16 on a left hand side in FIG. 1 and an actuator chamber 17 on a right hand side in FIG. 1 by the separator plate 15. The separator plate 15 is fixed on inner walls of the housing 13 in a manner perpendicular to an axis of the shaft 11. The reservoir chamber 16 is divided into an inner peripheral reservoir chamber 18 and an outer peripheral reservoir chamber 19 which are concentric and separated by the partition wall 40 which is substantially parallel to, and coaxially with, the axis of the shaft 11. The inner peripheral reservoir chamber 18 and the outer peripheral reservoir chamber 19 are not communicated with each other.

As illustrated in FIGS. 1 and 2, a plurality of pump protrusions 20 is formed on an end surface of the separator plate 15 facing the actuator chamber 17; four pump protrusions 20 are formed on the end surface of the separator plate 15 in this preferred embodiment. Further, a plurality of communication holes 21 is drilled through the separator plate 15 at positions disposed downstream in the rotary direction of the rotor 12 with respect to the pump protrusions 20. The rotary direction of the rotor 12 is specified by the arrow "C" in FIG. 2, and is the counterclockwise direction when viewed in the direction of the arrows A—A of FIG. 1. Namely, four communication holes 21 are drilled through the separator plate 15, and communicate the actuator chamber 17 with the outer peripheral reservoir chamber 19 in this preferred embodiment. Furthermore, a plurality of pump holes 22 are drilled through the separator plate 15 at positions disposed opposite to the communication holes 21 with respect to the pump protrusions 20; two pump holes 22 are drilled through the separator plate 15 at the positions in this preferred embodiment. The pump holes 22 communicate the actuator chamber 17 with the inner peripheral reservoir chamber 18 by way of a plurality of communication conduits 23. In this preferred embodiment, two communication conduits 23 are formed on an end surface of the separator plate 15 opposite to the end surface on which the pump protrusions 20 are formed.

In addition, fluid supply hole means in the form of a first fluid supply hole 24 and a second fluid supply hole 25 are drilled through at positions in an inner peripheral portion of the separator plate 15. The fluid supply holes 24 and 25 communicate the actuator chamber 17 with the inner peripheral reservoir chamber 18. A valve 26 is disposed in the inner peripheral reservoir chamber 18, and held detachably at a right end of a rod 28 in FIG. 1. The valve 26 opens and closes the first fluid supply hole 24 and the second fluid supply hole 25. Moreover, a temperature sensing member 27 such as a bimetal or the like is fixed at a left end of the rod 28 in FIG. 1, and is disposed outside the housing 13.

The rotor 12 is accommodated in the actuator chamber 17, and an end surface of the rotor 12 on a left hand side in FIG. 1 and an end surface of the separator plate 15 on a right hand side in FIG. 1 are disposed in a facing manner, thereby forming a labyrinth groove and a first torque transmitter portion 29. Further, an end surface of the rotor 12 on a right hand side in FIG. 1 and an inner wall of the actuator chamber 17 on a right hand side in FIG. 1 are disposed in a facing manner, thereby forming a labyrinth groove and a second torque transmitter portion 30. Furthermore, a communication conduit 31 is drilled through the rotor 12 at a position adjacent to an inner peripheral portion of the rotor 12 facing the second fluid supply hole 25, and communicates both end surfaces of the rotor 12.

Moreover, a fan (not shown) is fixed on an outer peripheral portion of the housing 13, and a viscous fluid such as silicone oil is sealed in the housing 13. Finally, the viscous fluid coupling apparatus 10 of this preferred embodiment is disposed on the engine so that the reservoir chamber 16 forms a front end surface of the engine and faces a rear surface of a radiator (not shown).

The operation of the viscous fluid coupling apparatus 10 having the above-mentioned arrangement will be hereinafter described. First, when the engine is stopped, part of the viscous fluid sealed in the housing 13 remains in the inner peripheral reservoir chamber 18. The rest of the viscous fluid passes through the communication holes 21, and remains in the lower portions of the outer peripheral reservoir chamber 19 and the actuator chamber 17. Accordingly, the first torque transmitter portion 29 and the second torque transmitter portion 30 are immersed in the viscous fluid to a lesser degree than if the outer peripheral reservoir chamber were not present.

When the engine is started, the rotary force of the crank shaft of the engine is transmitted to the shaft 11 by way of the belt, and the shaft 11 starts to rotate. At this moment, the torque to be transmitted to the housing 13 from the rotor 12 integral with the shaft 11 is extremely small because the first torque transmitter portion 29 and the second torque transmitter portion 30 are immersed in a reduced amount of the viscous fluid, as mentioned above, when the engine is not running. Thus, the fan fixed on the outer peripheral portion of the housing 13 rotates at an extremely low speed. Hence, the fan does not rotate to cool the engine even when the temperature of the engine cooling water is low right after starting the engine.

After the engine has been started and a predetermined time has passed, the temperature of the engine cooling water increases and there arises a need to rotate the fan. Since the viscous fluid coupling apparatus 10 of the preferred embodiment according to the present invention is provided with the fan fixed on the outer peripheral portion thereof, and since it is disposed between the engine and the radiator, the viscous fluid coupling apparatus 10 can forcibly cool the radiator, the engine cooling water and accordingly the engine by rotating the fan.

Namely, when the rotor 12 rotates, the viscous fluid in the actuator chamber 17 and the outer peripheral reservoir chamber 19 is gathered in the outer peripheral portions thereof by the centrifugal force resulting from the rotation of the rotor 12. Then, as illustrated in FIG. 3, the gathered viscous fluid is blocked by the pump protrusions 20, fed into the pump holes 22, and delivered to the inner peripheral reservoir chamber 18 by way of the communication conduits 23. On the other hand, the viscous fluid filled in the outer peripheral chamber 19 is fed into the actuator chamber 17 by way of the communication holes 21 by the action of a negative pressure which occurs at positions disposed downstream in the rotary direction of the rotor 12 with respect to the pump protrusions 20, and eventually to the inner peripheral chamber 18 in the above-mentioned manner.

In the above-mentioned circumstance, the air passing through the radiator is raised to a high temperature, because the temperature of the engine cooling water has increased. The high temperature is accordingly detected by the temperature sensing member 27, thereby rotating the valve 26. The higher the temperature of the air becomes, the larger a rotary movement of the valve 26. Namely, when the temperature of the air is not so high, the valve 26 rotates by a small rotary movement to open the first fluid supply hole 24 only. Consequently, the viscous fluid is supplied only to the first torque transmitter portion 29 from the inner peripheral reservoir chamber 18, and the rotor 12 transmits less torque to the housing 13. Hence, the fan rotates at a low rpm.

Thereafter, when the temperature of the engine cooling water is further raised and the temperature of the air passing through the radiator is further increased, the rotary movement of the valve 26 increases to open the second fluid supply hole 25 in addition to the first fluid supply hole 24. Consequently, the viscous fluid is supplied to the second torque transmitter portion 30 by way of the communication conduit 31, as well as to the first torque transmitter portion 29, from the inner peripheral reservoir chamber 18, and the rotor 12 transmits an increased amount of torque to the housing 13. Hence, the fan rotates at an increased rpm. Thus, the engine cooling water can be cooled in a manner appropriate for the temperature thereof.

Further, after the viscous fluid has transmitted the torque of the rotor 12 to the housing 13 via the first torque transmitter portion 29 and the second torque transmitter portion 30, the viscous fluid is gathered in the outer peripheral portion of the actuation chamber 17 by the centrifugal force resulting from the rotation of the housing 13. The viscous fluid is eventually recovered from the outer peripheral portion of the actuator chamber 17 to the inner peripheral reservoir chamber 18 by the action of the pump protrusions 20, the pump holes 22 and the communication conduits 23 working in the above-mentioned manner.

When the engine has been stopped thereafter, part of the viscous fluid remains in the inner peripheral reservoir chamber 18, and the rest of the viscous fluid passes through the communication holes 21 and remains in the lower portions of the outer peripheral reservoir chamber 19 and the actuator chamber 17 as mentioned above. Accordingly, when the engine is started again, less torque of the rotor 12 is transmitted to the housing 13, because the first torque transmitter portion 29 and the second torque transmitter portion 30 are immersed in a lesser amount of the viscous fluid. Thus, the induced rotation of the fan is less likely to occur. Even if it occurs, the fan rotates at an extermely low speed, thereby avoiding any cooling of the engine right after starting the engine.

Although four pump protrusions 20, four communication holes 21, two pump holes 22 and two communication conduits 23 are disposed on the separator plate 15 in the viscous fluid coupling apparatus 10 of the preferred embodiment according to the present invention, these numbers are not limiting. Additionally, it is preferred to employ a silicone oil or the like as the viscous fluid to be sealed in the viscous fluid coupling apparatus 10 of the preferred embodiment according to the present invention.

Having now fully described the present invention, it will be apparent to one of ordinary skill in the art that many changes and modifications can be made thereto without departing from the spirit or scope of the present invention as set forth herein.

What is claimed is:

1. A viscous fluid coupling apparatus comprising:
   a rotatably driven shaft;
   a rotor connected coaxially to said driven shaft and rotating integrally with said driven shaft;
   a housing relatively rotatably held by said driven shaft;
   a separator plate in said housing and dividing an inside of said housing into a reservoir chamber for storing a viscous fluid and an actuator chamber for accommodating said rotor, said separator plate disposed perpendicularly with respect to an axis of said shaft and having a communication hole penetrating therethrough for communicating said reservoir chamber with said actuator, and a pump protrusion for transferring viscous fluid in said reservoir chamber to said actuator chamber by way of said communication hole in accordance with rotation of said rotor,
   means on said rotor and at least one of said separator plate and said housing for forming a torque transmitter portion for transmitting torque between said rotor and said at least one of said separator plate and said housing in accordance with a variation in an amount of a viscous fluid in said actuator chamber;
   a partition wall in said reservoir chamber and dividing said reservoir chamber into an inner peripheral reservoir chamber disposed on a central portion of said reservoir chamber, and an outer peripheral reservoir chamber concentrically surrounding an outer periphery of said inner peripheral reservoir chamber, means for communicating said innner peripheral chamber with said actuator chamber, means for communicating said outer peripheral chamber with said actuator chamber;

wherein said partition walal is disposed substantially parallel and coaxial with respect to an axis of rotation of said shaft, and wherein said viscous fluid can be stored in said inner peripheral chamber and said outer peripheral chamber independently.

2. The viscous fluid coupling apparatus according to claim 1, wherein said separator plate further has a pump hole and a communication conduit cooperating with said pump protrusion for pumping viscous fluid in said actuator chamber to said inner peripheral chamber, said pump hole penetrating through said separator plate from an outer peripheral portion of said actuator chamber, said communication conduit extending substantially in a redial direction of said separator plate and communicating said pump hole with said inner peripheral reservoir chamber for transferring viscous fluid fed into said pump hole to said inner peripheral reservoir chamber.

3. The viscous fluid coupling apparatus according to claim 2, wherein said pump hole is disposed adjacent to said pump protrusion and upstream therefrom in a rotary direction of said rotor.

4. The viscous fluid coupling apparatus according to claim 1, wherein said communication hole is disposed adjacent to said pump protrusion and downstream therefrom in a rotary direction of said rotor.

5. The viscous fluid coupling apparatus according to claim 1, wherein said housing is rotatably held by said shaft via a bearing.

6. The viscous fluid coupling apparatus according to claim 1, wherein said separator plate further has a fluid supply hole means penetrating therethrough, communicating said inner peripheral reservoir chamber with said torque transmitter portion and supplying said viscous fluid in said inner peripheral reservoir chamber to said torque transmitter portion.

7. The viscous fluid coupling apparatus according to claim 6, wherein said fluid supply hole means includes a first fluid supply hole disposed at a predetermined position in an inner peripheral portion of said separator plate and a second fluid supply hole disposed at another position in an inner peripheral portion of said separator plate, said another position being nearer to a center of said separator plate than said predetermined position of said first fluid supply hole, and said rotor has a communication conduit penetrating therethrough and facing said second fluid supply hole.

8. The viscous fluid coupling apparatus according to claim 6, further comprising a temperature detecting means for detecting a temperature of an outside of said housing, and a valve for adjusting an opening amount of said fluid supply hole means in accordance with said temperature detected by said temperature detecting means whereby an amount of said viscous fluid passing through said fluid supply hole means is adjusted and said torque transmission from said rotor to said housing is controlled.

9. The viscous fluid coupling apparatus according to claim 8, wherein said valve is disposed in said inner peripheral reservoir chamber.

10. The viscous fluid coupling apparatus according to claim 1, wherein said torque transmitter portion comprises a labyrinth groove.

11. The viscous fluid coupling apparatus according to claim 1, wherein said torque transmitter portion includes a first torque transmitter means and a second torque transmitter means, said first torque transmitter means comprising an end surface of said rotor and said separator plate facing said end surface, and said second torque transmitter means comprising another end surface of said rotor and an inner wall of said housing facing said another end surface.

12. The viscous fluid coupling apparatus according to claim 1, wherein a plurality of said pump protrusions is disposed on the periphery of said separator plate at predetermined intervals.

13. The viscous fluid coupling apparatus according to claim 1, wherein said viscous fluid is a silicone oil and is sealed in said housing.

14. A viscous fluid coupling apparatus comprising:
a rotatably driven shaft;
a rotor engaged with said shaft;
a detachable housing relatively rotatably holding said shaft;
a separator plate in said housing and dividing an inside of said housing into an actuator chamber for accommodating said rotor and a reservoir chamber, said separator plate having a fluid supply hole disposed at an inner peripheral portion thereof, a pump hole disposed at an outer peripheral portion thereof and a pump protrusion disposed adjacent to said pump hole;
a partition wall concentrically dividing said reservoir chamber into an inner peripheral reservoir chamber and an outer peripheral reservoir chamber;
a communication conduit communicating said pump hole with said inner peripheral reservoir chamber, said communication conduit disposed on a surface of said separator plate opposite to a surface of said separator plate on which said pump protrusion is disposed; and
a communication hole through said seperator plate for communcating said actuator chamber with said outer peripheral reservoir chamber, said communication hole disposed opposite to said communication conduit with respect to said pump protrusion.

* * * * *